W. H. KENDALL.
MACHINE FOR FORMING AND PRESSING HATS.
APPLICATION FILED APR. 30, 1914.

1,130,088.

Patented Mar. 2, 1915.

2 SHEETS—SHEET 1.

WITNESSES:
Chas. J. Fitzsimmons
N. E. Bresnahan

INVENTOR
William H Kendall
BY
B. F. Wheeler
ATTORNEY

W. H. KENDALL.
MACHINE FOR FORMING AND PRESSING HATS.
APPLICATION FILED APR. 30, 1914.

1,130,088.

Patented Mar. 2, 1915.

2 SHEETS—SHEET 2.

WITNESSES:
Chas. J. Fitzsimons
M. E. Broesamle

INVENTOR
William H. Kendall
BY
B. A. Wheeler
ATTORNEY

UNITED STATES PATENT OFFICE.

WILLIAM H. KENDALL, OF HIGHLAND PARK, MICHIGAN, ASSIGNOR TO SARAH F. KENDALL, OF HIGHLAND PARK, MICHIGAN.

MACHINE FOR FORMING AND PRESSING HATS.

1,130,088.   Specification of Letters Patent.   Patented Mar. 2, 1915.

Application filed April 30, 1914. Serial No. 835,380.

*To all whom it may concern:*

Be it known that I, WILLIAM H. KENDALL, a citizen of the United States, residing at Highland Park, in the county of Wayne, State of Michigan, have invented certain new and useful Improvements in Machines for Forming and Pressing Hats; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a machine for forming and pressing hats, and consists in the construction and arrangement of parts as hereinafter more fully set forth and pointed out particularly in the claims.

The object of the invention is the provision of a comparatively simple and efficient machine for pressing and shaping hats to any desired form, in which compressed air is used as a medium for applying the required pressure and in which a two-part mold for containing the hat to be pressed is employed. The lower half of this mold is provided with a die of suitable form and is adapted to be heated, and the upper half of the mold is provided with a chamber for the air pressure and is adapted to be seated over the lower half of the mold to form a closure therefor. A removable flexible diaphragm is interposed between the two halves to divide the air chamber from the die of the mold to form an airtight connection between the two halves of the mold and to serve as a follower to conform to the contour of the die under the pressure of the air. Provision is also made for quickly opening the mold to remove the work therefrom and for securely locking the two parts of the mold together, as well as for controlling the air to admit or release the pressure in the mold.

Figure 1:
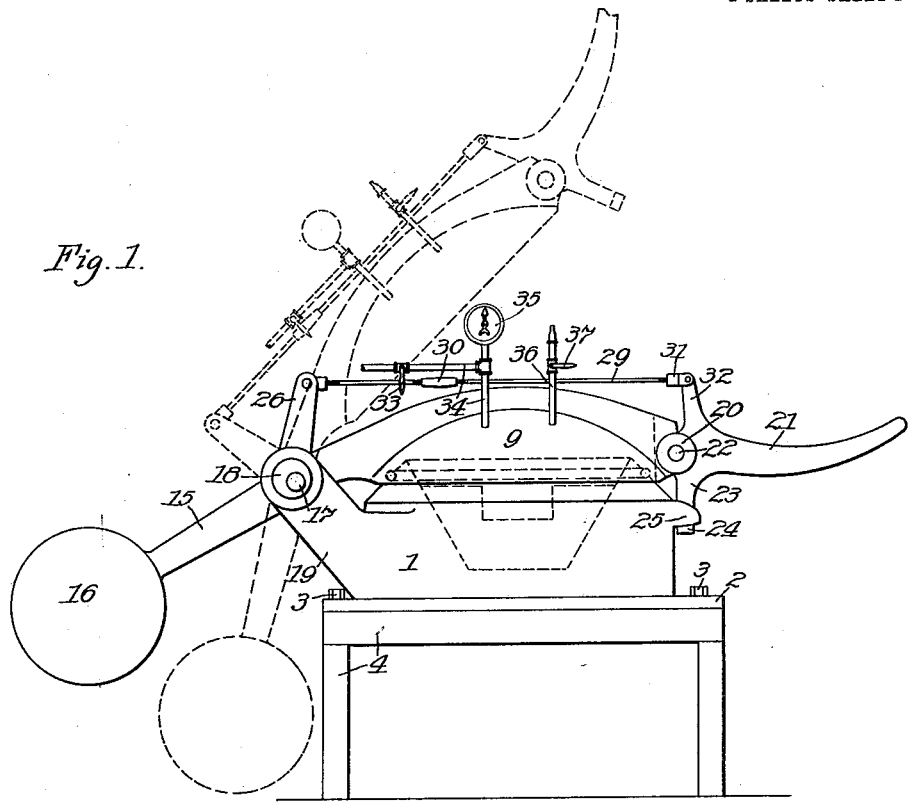
Figure 2:
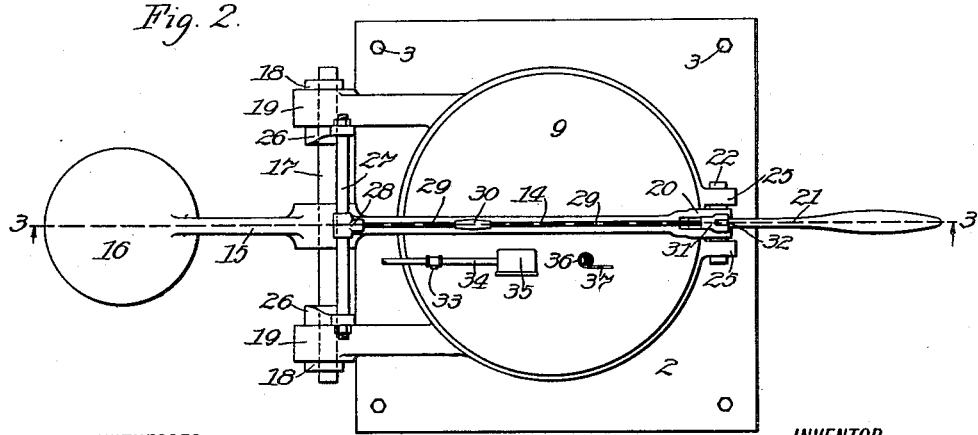
Figure 3:
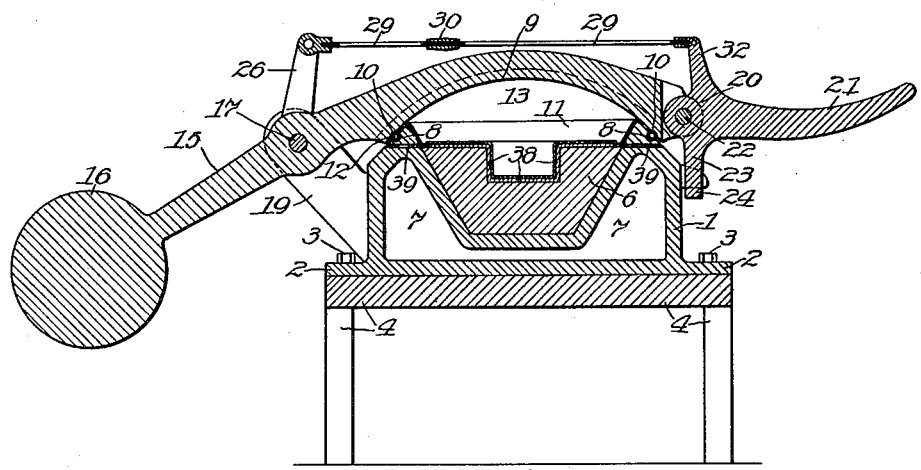
Figure 4:
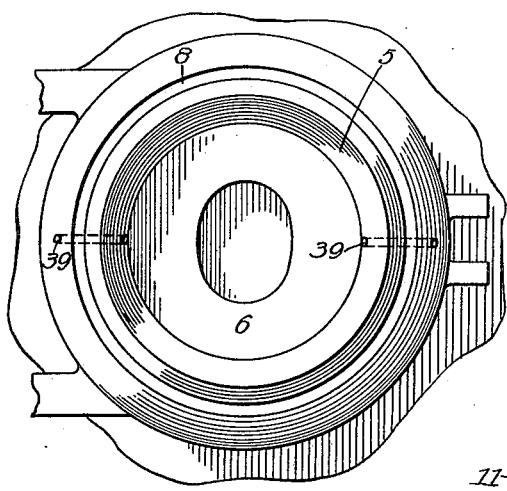
Figure 5:
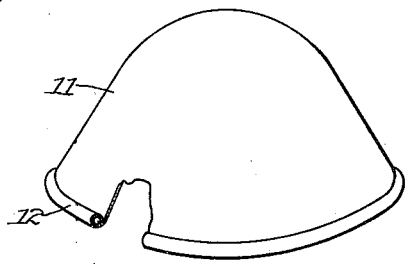

The above object is attained by the employment of the construction and arrangement of parts as illustrated in the accompanying drawings, in which:

Figure 1 is a side elevation of the machine showing the two parts of the mold closed and locked together as it would appear in operation, and indicating by dotted lines the raised position of the upper half when the mold is open. Fig. 2 is a plan view of the machine with the mold closed as in the position shown in Fig. 1. Fig. 3 is a central longitudinal section through the machine on dotted line 3—3 of Fig. 2, showing a hat in the die of the mold and a flexible diaphragm forced into contact with the inner surface of the hat by the air pressure in the chamber of the upper half of the mold. Fig. 4 is a plan view of the lower half of the mold, showing the forming die therein. Fig. 5 is a perspective view of a conical flexible diaphragm having a portion of the side wall broken away showing a rolled ringed edge or welt extending around the periphery.

Referring to the drawings by the characters of reference marked thereon, 1 designates the bed of the machine which is cylindrical in form and constitutes the lower half of a two-part mold, the base of which is provided with a laterally projecting flange 2 through which bolts or screws 3 may be passed to secure it to a suitable bench or frame support 4. Extending well into the body of the member 1, from the upper end thereof, is a conical shaped opening 5 into which is seated a matrix or die 6 having sunk therein a depression the formation of which is the shape of the hat to be pressed, and surrounding said die is a chamber 7 cored out of the body of the member 1 for the circulation of steam, hot water or other heating element by means of which the forming die may be heated. The upper surface of the member 1 is beveled downwardly and outwardly from the top of the conical opening 5, and formed in this tapered surface concentric with said conical opening is an annular concavity 8.

The upper half of the mold consists of a circular concavo-convex cap 9, in which the concavity forms an air space and the arc of the concaved surface is adapted to register and coincide at its periphery with the upper beveled surface of the member 1, having formed concentric therein an annular concavity 10 adapted to register with the concavity 8 of said member 1.

Embraced between the cap 9 and the base member 1, is a conical shaped flexible diaphragm 11 which extends across the opening 5 above the die 6 and lies between the opposed inclined faces of the cap and base member to divide said members and form a closure for the air chamber 13 in the concavity of said cap. The base or periphery of the conical diaphragm 11 is rolled to form a pliable ring or welted edge 12 which is adapted to seat in the annular concavities 8 and 10 of the base and cap members respectively, and serves as a gasket or packing ring to effect an air-tight closure between said members. Said diaphragm is adapted to be folded onto the upper surface of a hat placed in the die 6 and to be forced by air pressure admitted to the chamber 13 into contact therewith to cause said hat to conform to the contour of the depression in said die.

As a means for securing the cap member 9 to the lower member 1 of the mold in a manner to enable the parts to be firmly locked together and quickly opened for the placing of a hat therein to be formed, said cap is provided with a rib 14 extending across its upper arc and projecting at one end in an overhanging arm 15 carrying thereon a counter-balance weight 16. Said arm is pivoted to swing upon a shaft 17 which is journaled at its ends in eccentric sleeves 18 that in turn are journaled in the ends of rearwardly projecting supports 19 on the base member 1. The forward end of the rib 14 is provided with a divided ear 20, between the sides of which a locking lever 21 is pivoted upon a pintle 22. The lever 21 is provided with a depending latch 23 having laterally projecting shoulders 24 which engage with shouldered ears 25 projecting from the body member 1, by means of which a locking engagement is effected between the two parts at the forward side of the mold.

To provide for adjusting the hinge or pivotal connection of the two parts of the mold to insure a close fitting contact between the meeting parts, the eccentric sleeves 18 forming the hinge connection are each provided with an upwardly extending crank-arm 26 which are connected together at their upper ends by means of a tie rod 27, and pivotally connected to the rod 27, by means of a clevis 28, is a connecting rod 29, having a turn buckle 30 thereon. The opposite end of said connecting rod is pivotally connected by a clevis 31 with an upwardly extending arm 32 on the locking lever 21. By this means, as said locking lever is swung into engagement with the ears of the member 1 to lock the parts of the mold together, movement will be imparted through the connecting rod 29 to rotate the eccentric sleeves 18 and thereby exert a downward movement upon the cap 9 at its pivotal side of the mold simultaneously with the drawing of the parts together in the locking of the forward side of the mold.

Air is admitted to the chamber 13 of the mold through a valve 33 in a pipe line 34 communicating with a source of pressure and with the chamber 13 through the cap 9. A pressure gage 35 may be connected in the pipe line 34 and an exhaust pipe 36 having a valve 37 for releasing the pressure from the chamber 13 is connected therewith through the cap 9.

The parts being thus constructed and arranged, the operation of the device is as follows: The base of the mold having been heated to the proper temperature, the cap is swung up to the dotted position shown in Fig. 1, in which position it will be held by the counterweight on the arm 15. The hat to be pressed is then placed in position within the mold as shown at 38 in Fig. 1. The flexible conical diaphragm is then placed with its rolled edge 12 into the concavity 8 of the member 1 of the mold. The cap is then swung down and locked by the lever 21, as shown in Figs. 1 and 3, in which position the rolled edge of the flexible diaphragm will be confined between the concavities of the meeting faces of the two parts of the mold, forming an air-tight closure between them. The air is then admitted into the chamber 13 through the valve 33, and the pressure thus exerted upon the diaphragm will force it into close contact with the upper surface of the hat, forcing said hat firmly into contact with the heated surface of the die, in which position it is allowed to remain under pressure until sufficiently heated and pressed to set it to shape.

To provide for the escape of air that may be present in the mold between the lower surface of the diaphragm and the upper face of the die, vent ports 39 are formed through the upper end of the member 1 and communicate with the opening 5 and with the exterior of the mold at a point below the bottom of the cap 9, whereby the air may freely escape from the mold and insure a close contact between the hat and die.

When the operation has been completed, the lever 21 may be swung upwardly to unlock the cap and enable the mold to be opened to remove the diaphragm and hat from the die and to again repeat the operation as before described.

Having thus fully set forth my invention, what I claim as new, and desire to secure by Letters Patent, is:

1. A machine for pressing hats, comprising a base adapted to be heated and to contain a forming die, a cap detachably mounted on said base and having an air chamber therein, a detached flexible conical diaphragm interposed and confined between the opposed faces of said base and cap at its periphery to form a closure for the air chamber of said cap, a valve controlled inlet for admitting air to said chamber to depress said diaphragm into said die, a vent port in said base below said diaphragm, and a valve controlled outlet for the air chamber in said cap.

2. A machine for pressing hats, comprising a base adapted to be heated and having a die seat therein adapted to receive a forming die, an annular concavity in the upper end of said base surrounding said die seat, a vent port through the wall of said base communicating with said die seat below said annular concavity, a cap hinged to swing on said base and having detachable locking means for engagement therewith, an air chamber in said cap, an annular concavity surrounding said chamber in said cap and adapted to register with the annular concavity of said base, a detached flexible conical diaphragm having a pliable ringed periphery adapted to be confined between the concavities of said base and said cap to divide said members and form an air-tight joint between them, a valve controlled air inlet for admitting air to said chamber to depress said diaphragm into said die, and a valve controlled outlet for the air chamber in said cap.

3. A machine for pressing hats, comprising a hollow base adapted to be heated and to contain a forming die, a cap pivoted to swing on eccentric bushings mounted on said base and having an open air chamber therein, a lever pivoted to said cap for engagement with locking shoulders on said base, a rod connecting said lever with said eccentric bushings for rotating said bushings through the movement of said lever, a detached pliable conical diaphragm interposed between said cap and base to form a closure for the air chamber of said cap, a valve controlled inlet in said cap for admitting air to said chamber to depress said diaphragm into said die, a vent port in said base below said diaphragm, and a valve controlled outlet for the air chamber in said cap.

In testimony whereof, I sign this specification in the presence of two witnesses.

WILLIAM H. KENDALL.

Witnesses:
 B. F. WHEELER,
 M. E. BROESAMLE.

Copies of this patent may be obtained for five cents each, by addressing the "Commissioner of Patents, Washington, D. C."